United States Patent
Stille et al.

(10) Patent No.: US 8,038,394 B2
(45) Date of Patent: Oct. 18, 2011

(54) SYSTEM AND METHOD OF DAMPING A 1P MOTION

(75) Inventors: Brandon L. Stille, Cheshire, CT (US); William A. Welsh, North Haven, CT (US); Timothy Fred Lauder, Oxford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 946 days.

(21) Appl. No.: 12/015,149

(22) Filed: Jan. 16, 2008

(65) Prior Publication Data

US 2009/0180882 A1    Jul. 16, 2009

(51) Int. Cl.
*F01D 5/18* (2006.01)

(52) U.S. Cl. ............................. 416/1; 416/106; 416/500

(58) Field of Classification Search ....... 416/1, 105–107, 416/140, 141, 500, 31, 35–38, 40, 42
See application file for complete search history.

(56) References Cited

U.S. PATENT DOCUMENTS

| | | | |
|---|---|---|---|
| 3,282,350 A * | 11/1966 | Kisovec | 416/106 |
| 3,484,173 A * | 12/1969 | Rybicki | 416/106 |
| 4,004,757 A | 1/1977 | Doman | |
| 4,073,600 A | 2/1978 | Doman | |
| 4,231,705 A | 11/1980 | Watson | |
| 4,252,504 A | 2/1981 | Covington et al. | |
| 4,297,078 A | 10/1981 | Martin | |
| 4,371,939 A | 2/1983 | Adams et al. | |
| 4,389,161 A | 6/1983 | Brumen | |
| 4,392,203 A | 7/1983 | Fischer et al. | |
| 4,436,483 A | 3/1984 | Watson | |
| 4,437,313 A | 3/1984 | Taber et al. | |
| 4,444,544 A | 4/1984 | Rowley | |
| 4,484,283 A | 11/1984 | Verzella et al. | |
| 4,549,850 A | 10/1985 | Vincent | |
| 4,566,857 A | 1/1986 | Brumen | |
| 4,601,639 A | 7/1986 | Yen et al. | |
| 4,712,978 A | 12/1987 | Tiemann | |
| 4,874,292 A | 10/1989 | Matuska et al. | |
| 4,886,419 A | 12/1989 | McCafferty | |
| 4,915,585 A | 4/1990 | Guimbal | |
| 5,092,738 A | 3/1992 | Byrnes et al. | |
| 5,151,013 A | 9/1992 | Moore | |
| 5,211,538 A | 5/1993 | Seghal et al. | |
| 5,242,267 A | 9/1993 | Byrnes et al. | |
| 5,249,926 A | 10/1993 | D'Anna et al. | |
| 5,263,821 A | 11/1993 | Noehren et al. | |
| 5,322,415 A | 6/1994 | White et al. | |
| 5,372,478 A * | 12/1994 | McCafferty | 416/106 |
| 5,913,659 A | 6/1999 | Doolin et al. | |
| 5,951,252 A | 9/1999 | Muylaert | |
| 6,036,442 A | 3/2000 | Certain et al. | |
| 6,170,779 B1 | 1/2001 | Nyhus | |
| 6,213,712 B1 | 4/2001 | Muylaert | |
| 6,695,253 B1 | 2/2004 | Romani et al. | |
| 6,695,583 B2 | 2/2004 | Schmaling et al. | |
| 6,886,777 B2 | 5/2005 | Rock | |
| 7,035,124 B2 | 4/2006 | Chadwick et al. | |
| 7,607,892 B2 * | 10/2009 | Beroul | 416/106 |

* cited by examiner

*Primary Examiner* — Edward Look
*Assistant Examiner* — Andrew C Knopp
(74) *Attorney, Agent, or Firm* — Carlson Gaskey & Olds, P.C.

(57) ABSTRACT

A rotor system includes a multiple of rotor blade yokes mounted to a rotor hub. A lead/lag damper is mounted to each of the rotor blade yokes and to a damper hub. An actuator system is operable to shift a damper hub axis of rotation relative the rotor axis of rotation to minimize 1P damper motions. A method of minimizing 1P damper motions within a rotor system includes shifting the damper hub axis of rotation relative the rotor axis of rotation to oscillate an inner connector of each lead/lag damper in phase with a 1P blade motion to minimize the 1P motion of the damper.

20 Claims, 8 Drawing Sheets

SYSTEM AND METHOD OF DAMPING A 1P MOTION

STATEMENT REGARDING FEDERALLY SPONSORED RESEARCH OR DEVELOPMENT

This invention was made with Government support under N00019-06-C-0081 awarded by The United States Navy. The Government has certain rights in this invention.

BACKGROUND OF THE INVENTION

The present invention relates to a damper system, and more particularly to a mechanical lead/lag damper system for a rotor system of a rotary wing aircraft.

Rotary-wing aircraft include lead/lag dampers to increase rotor blade lead/lag mode damping characteristics. The damper assembly reacts against lead/lag motions of each rotor blade assembly of the rotor system to dampen harmonic oscillations due to the lead-lag motion of the rotor blades.

The lead-lag motion of the rotor blades is primarily described by two frequencies, 1P motion and approximately 1/3P motion (once per revolution and once per three revolutions, respectively). The 1P motion, although the largest in amplitude, does not typically require damping as the 1P motion remains substantially stable. The 1/3P motion (e.g., regressive lag mode) is typically a relatively small amplitude, but may become unstable if undampened and excited by certain flight conditions and ground resonances of the rotary-wing aircraft.

A single lead/lag damper on each blade suppresses the 1/3P motion but needs to also endure the 1P motion such that the lead/lag damper may provide some damping of the 1P motion—even though none is required. To provide ample damping of the 1/3P motion and endure the 1P motion, the damper has to be oversized, primarily because of the 1P motion.

Although effective, current lead/lag dampers operate under high pressures and require a relatively long stroke which may require relatively comprehensive maintenance attention. As each rotor blade requires a lead/lag damper, the dampers may increase the overall structural envelope and weight of the rotor system.

SUMMARY OF THE INVENTION

A rotor system according to an exemplary aspect of the present invention includes: a rotor hub which rotates about a rotor axis of rotation; a multiple of rotor blade yokes mounted to the rotor hub; a damper assembly mounted to the rotor hub, the damper assembly having a damper hub rotatable about a damper hub axis of rotation; a lead/lag damper mounted to each of the rotor blade yokes and the damper hub; and an actuator system operable to shift the damper hub axis of rotation relative the rotor axis of rotation to minimize 1P damper motions.

A method of minimizing 1P damper motions within a rotor system according to an exemplary aspect of the present invention includes attaching an outer connector of a lead/lag damper to a rotor blade yoke mounted to a rotor hub which rotates about a rotor axis of rotation; attaching an inner connector of the lead/lag damper to a damper assembly mounted to the rotor hub about a damper hub axis of rotation; and shifting the damper hub axis of rotation relative the rotor axis of rotation to position the inner connector of each lead/lag damper to at least partially minimize 1P damper motions.

BRIEF DESCRIPTION OF THE DRAWINGS

The various features and advantages of this invention will become apparent to those skilled in the art from the following detailed description of the disclosed non-limiting embodiment. The drawings that accompany the detailed description can be briefly described as follows.

DETAILED DESCRIPTION OF THE DISCLOSED EMBODIMENTS

Figure 1:
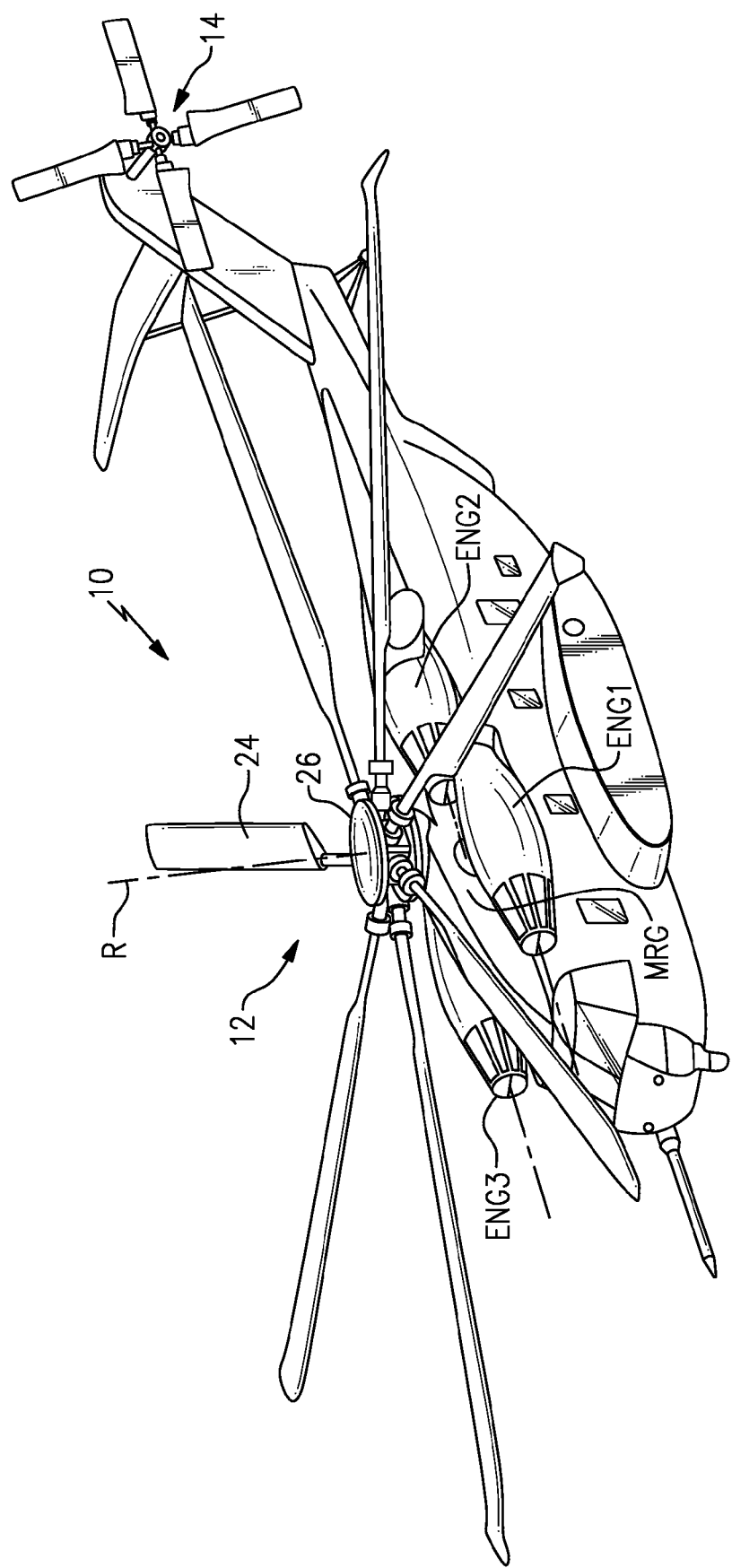
FIG. 1 is a general perspective view of one non-limiting embodiment rotary wing aircraft.

FIG. 1 schematically illustrates an exemplary vertical take-off and landing (VTOL) rotary-wing aircraft 10. The aircraft 10 in this non-limiting embodiment includes a main rotor system 12 supported by an airframe 14 having an extending tail 16 which mounts an anti-torque system 18 such as a tail rotor system. The main rotor assembly 12 is driven about a rotor axis of rotation R through a main rotor gearbox MGR by one or more engines ENG (in this example, three engines ENG1-ENG3 are shown). The main rotor system 12 includes a multiple of rotor blades assemblies 24 mounted to a rotor hub 26. Although a particular helicopter configuration is illustrated and described in this exemplary embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from the present invention.

Figure 2:
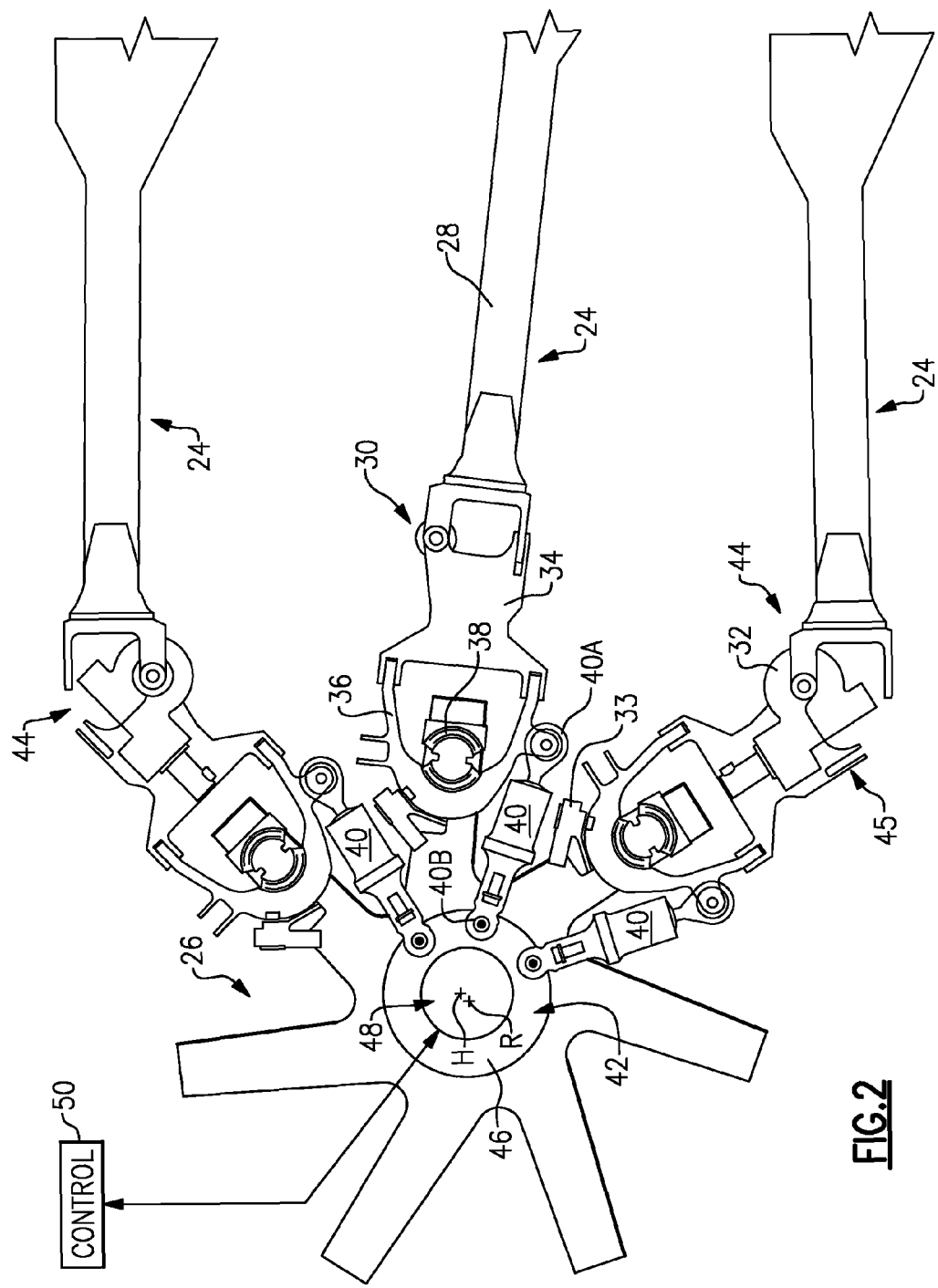
FIG. 2 is a top plan view of a main rotor assembly illustrating a damper system according to one non-limiting embodiment of the present invention in which three rotor blades (two blades of which are shown in partially folded positions) are shown from a seven bladed rotor system.

Referring to FIG. 2, the multiple of rotor blade assemblies 24 are each mounted to the rotor hub 26 which rotates about the axis of rotation R. Each rotor blade assembly 24 generally includes a rotor blade 28, a hinge assembly 30, a rotary actuator 32, a sleeve 34, a rotor blade yoke 36, an elastomeric bearing 38, and a lead/lag damper 40 of a damper assembly 42.

An optional blade folding system 44 (two blades shown in partially folded positions) may include a blade lock assembly 45, the rotary actuator 32, and a retractable blade retaining pin 33 to selectively position each rotor blade assembly 24 in a particular folded position to minimize the aircraft structural envelope. It should be understood that alternative or additional systems may be included within the blade folding system 44.

The rotor blade yoke 36 is mounted to the rotor hub 26 through the elastomeric bearing 38 such that the blade assembly 24 may move in flapping, pitch and lead/lag motions as generally understood. The elastomeric bearing 38 substantially operates in compression but it should be understood that other rotor blade bearing systems may alternatively or additionally be utilized.

Figure 3A:
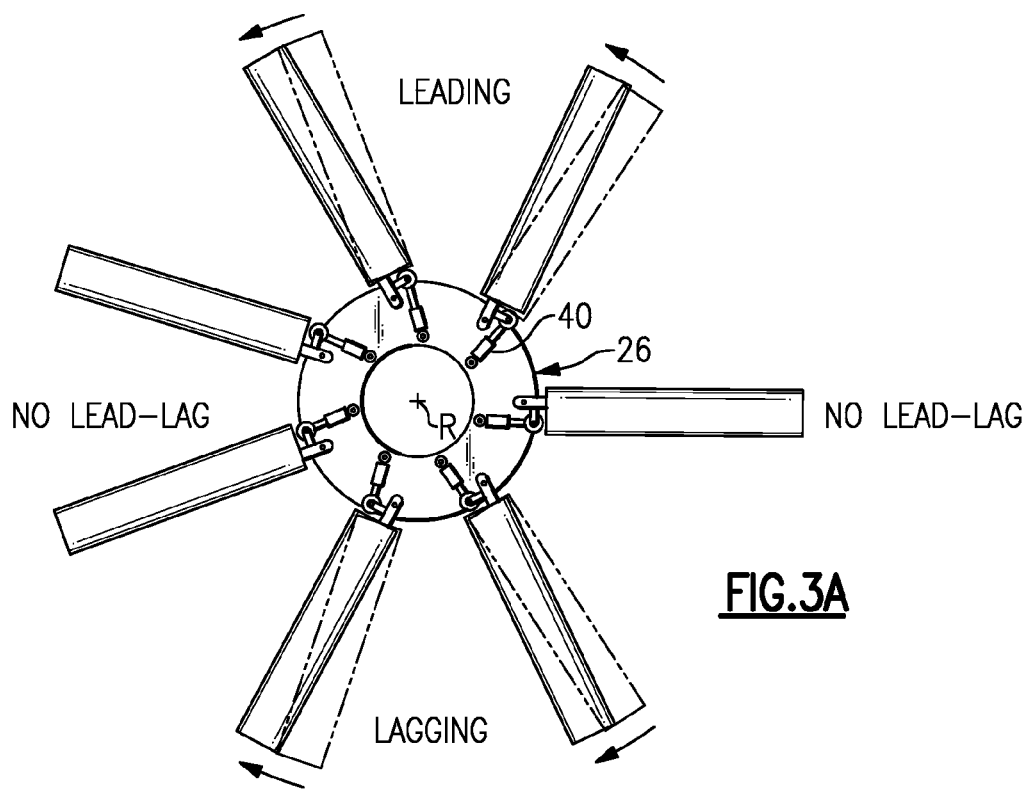
FIG. 3A is a top plan view of a main rotor assembly illustrating an exemplary leading and lagging position of each rotor blade.
Figure 3B:
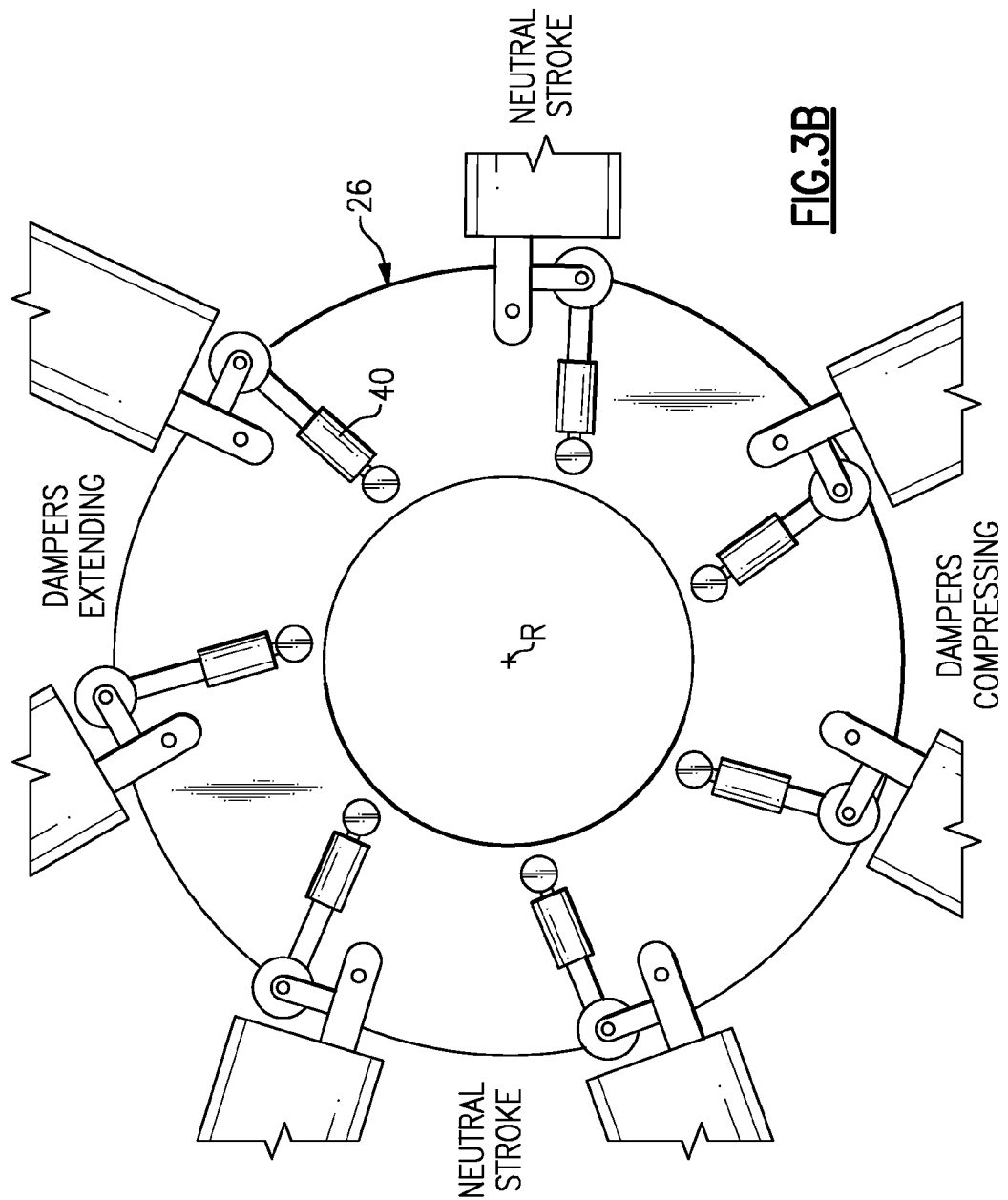
FIG. 3B is a top plan expanded view of the main rotor assembly of FIG. 3A illustrating the stroked position of each lead/lag damper in response to an exemplary leading and lagging position of each rotor blade.

Each lead/lag damper 40 reacts against lead/lag motions (FIGS. 3A and 3B) of each blade assembly 24 so as to dampen 1/3P and 1P vibration. Each lead/lag damper 40 is mounted between the blade yoke 36 at an outer connector 40A and a damper hub 46 of the damper assembly 42 at an inner connector 40B. The connectors 40A, 40B may include various links such as ball links or such like.

The damper hub 46 rotates about axis of rotation H and can be translated in two dimensions relative the axis of rotation R of the rotor hub 26. That is, the damper hub 46 can be shifted within the plane of the rotor hub 26 while rotating therewith to shift the inner connector 40B of each lead/lag damper 40. The damper hub 46 is shifted off the rotor hub axis of rotation R by an actuator system 48 in response to a controller 50 such as a flight control computer (FCC). The dampers 40, damper hub 46 and the actuator system 48 define a lead/lag damper system 52.

Figure 4:
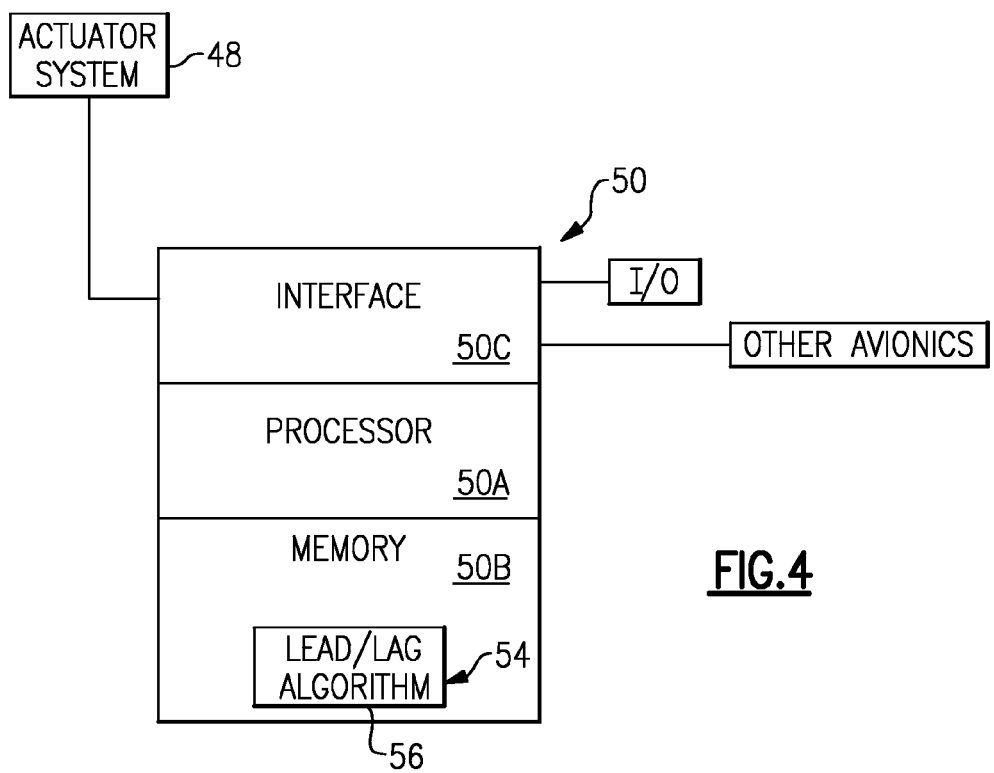
FIG. 4 is a schematic block diagram of a controller for use with one non-limiting embodiment of the present invention.

Referring to FIG. 4, the controller 50 (e.g., FCC) includes a lead/lag module 54 having an isolated mode regressive lead/lag damper eccentric location algorithm 56. The lead/lag module 54 communicates with the controller 50 to obtain aircraft dynamic state as well as other data to control the damper system 52. It should be understood that although the disclosed non-limiting embodiment is discussed in terms of an implementation for augmenting damping for the regressive lag mode (RLM), the approach disclosed herein is readily applicable to other lag modes such as collective or progressive lag modes.

The controller 50 typically includes a processor 50A, a memory 50B, and an interface 50C for communicating with other avionics systems and components (e.g., I/O, input/output). The controller 50 stores data and control algorithms such as isolated mode regressive lead/lag damper eccentric location algorithm 56 for the lead/lag module 54 in the memory 50B or other computer readable medium for operation of the processor 50A. The stored data and control algorithms are the scheme by which decisions are made to control operations performed and disclosed herein. Although the controller 50 is schematically illustrated as a single block, it should be understood that the controller 50 may include multiple systems, subsystems, modules and other controls often as line replaceable units (LRUs). It is also noted that the controller 50 can be implemented in hardware, such as a very large scale integrated circuit (VLSI), or may also include one or more integrated circuits having part or all of the processor 50A, memory 50B, and interface 50C.

Figure 5A:
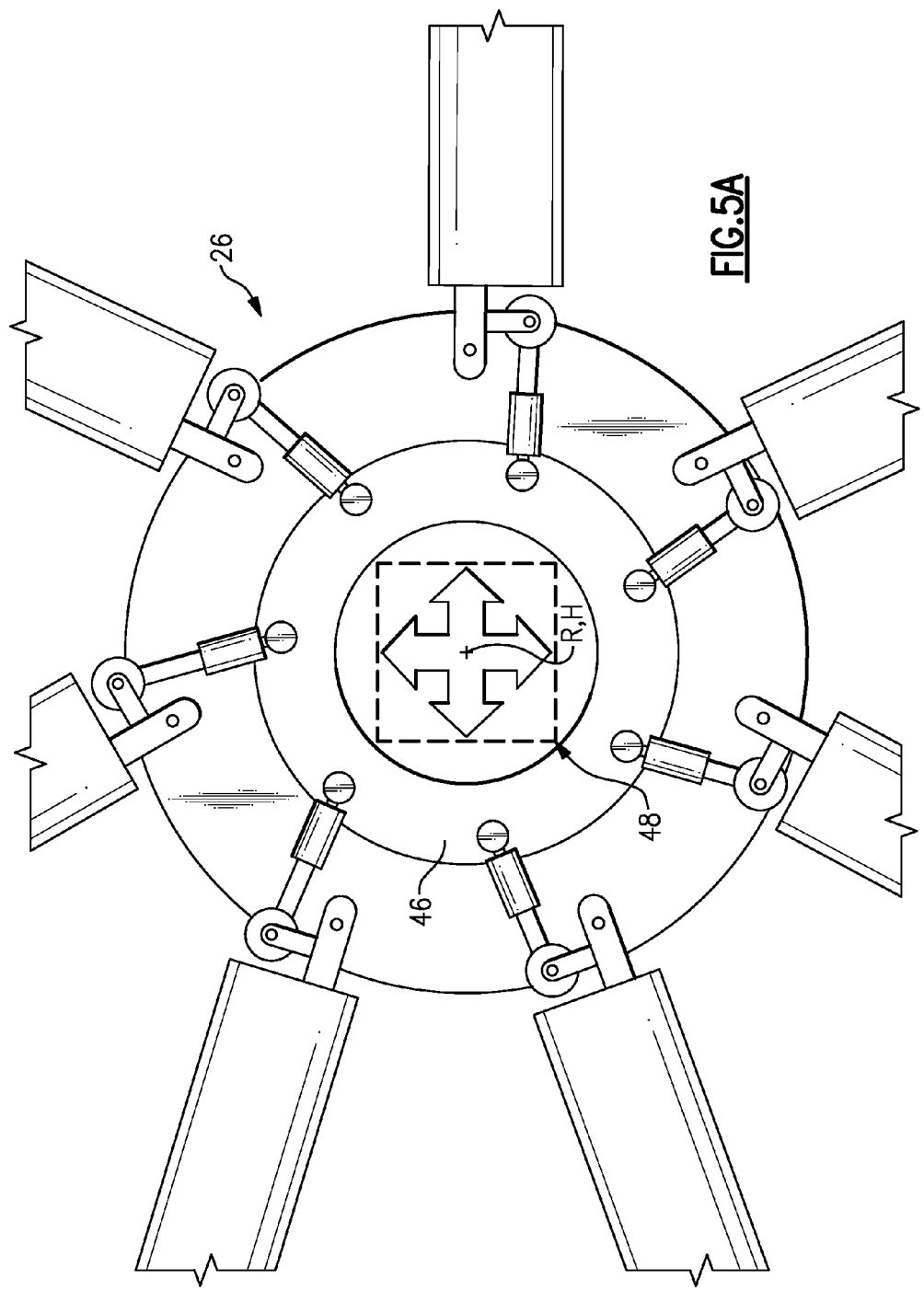
FIG. 5A is a top plan view of a main rotor assembly illustrating one non-limiting embodiment of a damper system in a first position.
Figure 5B:
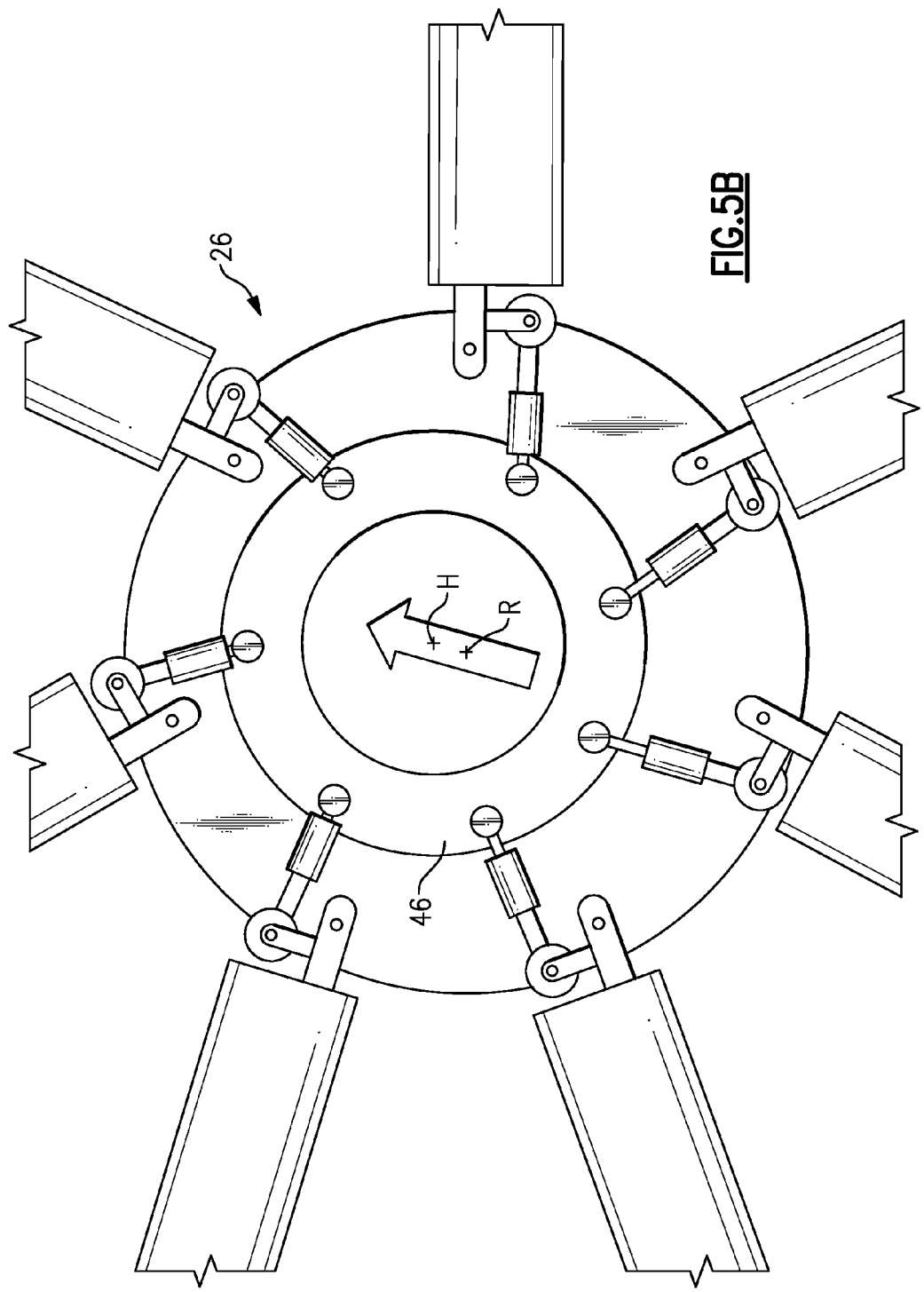
FIG. 5B is a top plan view of the main rotor assembly of FIG. 5A illustrating the damper system of FIG. 5A in a second position which reduces (e.g., minimizes) a 1P motion.
Figure 6:
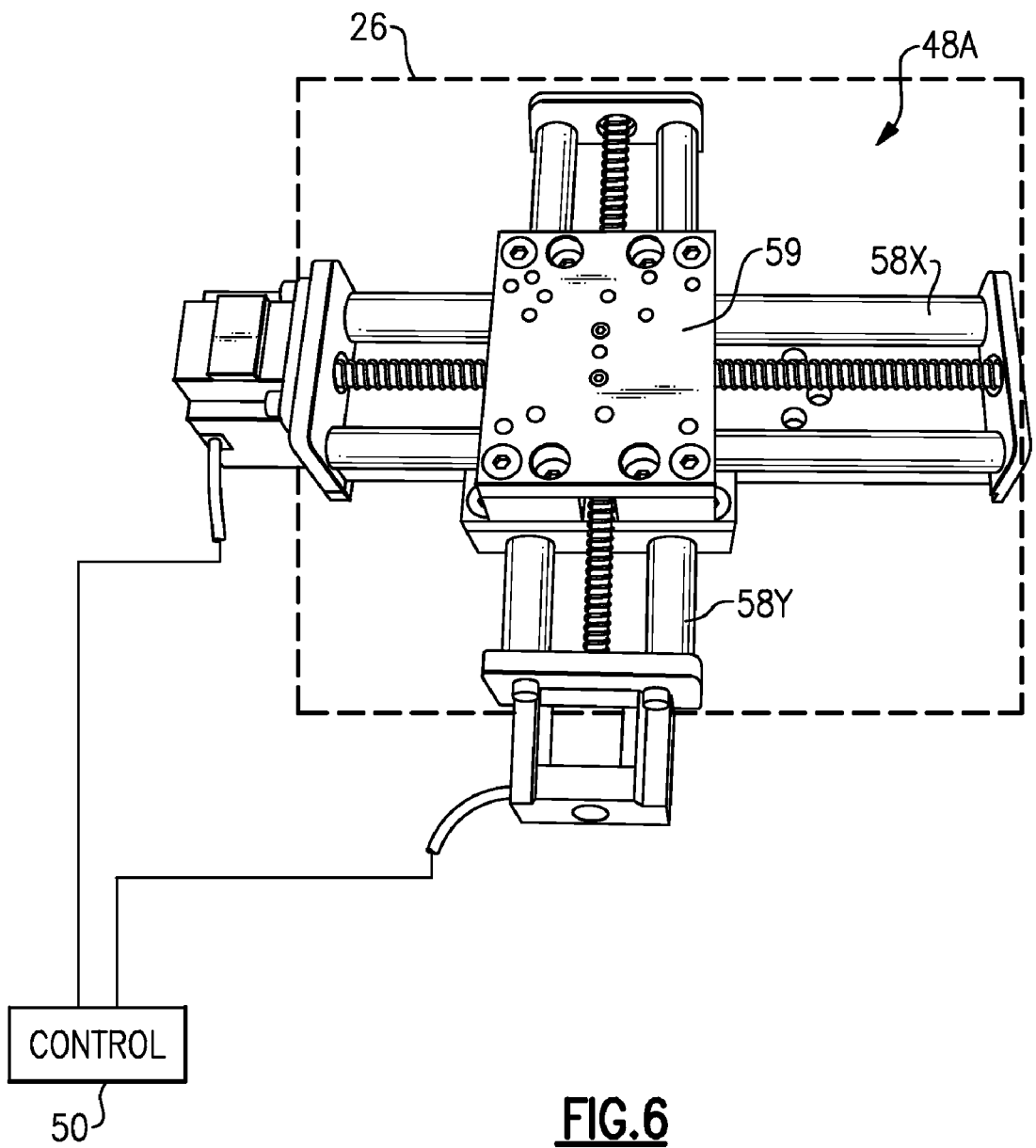
FIG. 6 is a perspective view of one non-limiting embodiment of an actuator system of the damper system.

Referring to FIG. 5A, the actuator system 48 of the damper assembly 42 may include an X-Y positioning actuator system 48A (FIG. 6). The X-Y positioning actuator system 48A may include a first actuator 58X for operation in the X-direction and a second actuator 58Y for operation in the Y-direction. The first and second actuators 58X, 58Y are mounted within the rotor hub 26 to position a support 59 mounted to the damper hub 46 (FIG. 6). The first and second actuators 58X, 58Y may include, for example only, a screw actuator, a piston arrangement or such like. Operation of the X-Y positioning actuator system 48A will thereby shift the damper hub 46 axis of rotation H in two dimensions relative the axis of rotation R of the rotor hub 26 yet maintain coincident rotation therewith (FIG. 5B).

Figure 5C:
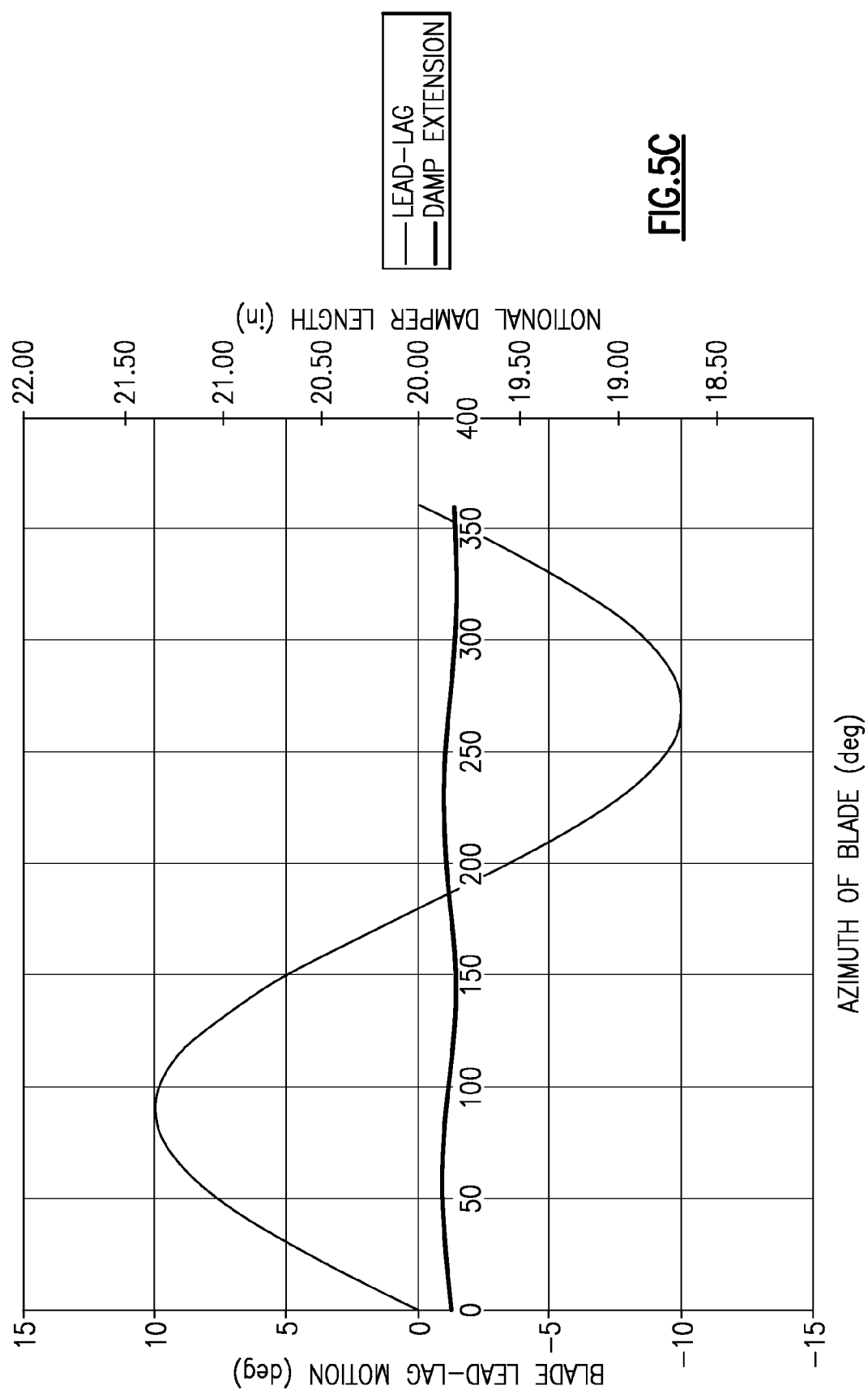
FIG. 5C is a graphical representation of 1P motion isolation in response to movement of the damper system of FIG. 5A.

The damper hub 46 is shifted off the rotor hub axis of rotation R by the actuator system 48 in response to the isolated mode regressive lead/lag damper eccentric location algorithm 56 to isolate the 1P motions from the 1/3P motions so that each lead/lag damper 40 need be sized to dampen only the 1/3P motion as the 1P motion is almost completely eliminated thereby (FIG. 5C). By mechanically oscillating the inner connector 40B of each lead/lag damper 40 in phase with the 1P blade motion, each lead/lag damper 40 need only stroke for the 1/3P motion which results in a reduced damper requirement sized for the 1/3P motion. A significantly smaller and lighter weight lead/lag damper 40 is thereby achieved. A lead/lag damper 40 sized for 1/3P also strokes a relatively small distance (typically less than 0.25 inches) which increases seal life and provides less overall wear and tear on the damper system 52. This weight savings is somewhat offset by the actuator system 48, however, an overall net weight savings is provided as well as an overall repair and maintenance reduction.

In operation, the lead/lag module 54, in one non-limiting embodiment, may shift the damper hub 46 of the damper assembly 42 off the rotor hub axis of rotation R in response to a flight condition and maintain the damper hub 46 at that position during that flight condition. For example only, the isolated mode regressive lead/lag damper eccentric location algorithm 56 of the lead/lag module 54 may shift the damper hub 46 in response to a hover flight profile, a forward flight profile and/or a high speed forward flight profile. It should be understood that other flight conditions may alternatively or additionally be provided.

It should be understood that relative positional terms are with reference to the normal operational attitude of the vehicle and should not be considered otherwise limiting. It should be understood that although a particular component arrangement is disclosed in the illustrated embodiment, other arrangements will benefit from the instant invention. A sensor (I/O) could determine the amplitude of lead-lag motion at 1P. This information would be input to the Interface 50C to position the damper hub 46 and provide adaptive suppression of the 1P motion of the damper. Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The non-limiting embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:
1. A rotor system comprising:
    a rotor hub operable to rotate about a rotor axis of rotation;
    a multiple of rotor blade yokes mounted to said rotor hub;
    a damper hub mounted to said rotor hub for rotation therewith, said damper hub defines a damper hub central axis, said damper hub shiftable relative to said rotor hub;

a lead/lag damper mounted to each of said rotor blade yokes and said damper hub; and an actuator system operable to shift said damper hub such that said damper hub central axis is shifted relative to said rotor axis of rotation.

2. The system as recited in claim 1, wherein said actuator system is operable to shift said damper hub in at least two dimensions within a plane generally parallel to said rotor hub.

3. The system as recited in claim 1, wherein said actuator system is operable to shift said damper hub within a plane of said rotor hub.

4. The system as recited in claim 1, wherein said damper hub maintains coincident rotation with said rotor hub.

5. The system as recited in claim 1, wherein said actuator system comprises an X-Y positioning actuator system.

6. The system as recited in claim 1, wherein each of said rotor blade yokes is mounted to said rotor hub through at least an elastomeric bearing.

7. The system as recited in claim 6, wherein each of said elastomeric bearings operates substantially in compression.

8. The system as recited in claim 6, wherein said rotor hub is a main rotor hub of a rotary wing aircraft.

9. The system as recited in claim 6, wherein said lead/lag damper is sized for a 1/3P motion.

10. The system as recited in claim 1, wherein said actuator system comprises an X-Y positioning actuator system mounted within the rotor hub to position a support mounted to said damper hub to shift said damper hub central axis relative to said rotor axis of rotation.

11. The system as recited in claim 10 wherein shifting said damper hub central axis relative to said rotor axis of rotation biases each of said lead lag dampers.

12. The system as recited in claim 10 wherein shifting said damper hub central axis relative to said rotor axis of rotation changes a compression of an elastomeric bearing which mounts each of said yokes to said rotor hub.

13. The system as recited in claim 1, further comprising a controller operable to control said actuator system to shift said damper hub central axis relative to said rotor axis of rotation to mechanically oscillate the damper hub in phase with the 1P blade motion.

14. The system as recited in claim 13, wherein said controller operates in response to an isolated mode regressive lead/lag damper eccentric location algorithm.

15. A method of minimizing 1P damper motions within a rotor system comprising:

attaching an outer connector of a lead/lag damper to a rotor blade yoke mounted to a rotor hub which rotates about a rotor axis of rotation;

attaching an inner connector of the lead/lag damper to a damper hub mounted to the rotor hub for rotation therewith, the damper hub defines a damper hub central axis shiftable relative to the rotor axis of rotation; and shifting the damper hub central axis relative to said rotor axis of rotation to position the inner connector of each lead/lag damper to at least partially minimize 1P damper motions.

16. The method as recited in claim 15, wherein said shifting further comprises:

shifting the damper hub off the rotor hub axis of rotation in response to a flight condition.

17. The method as recited in claim 15, wherein said shifting further comprises:

shifting the damper hub off the rotor hub axis of rotation in a phase relative to a 1P blade motion.

18. The method as recited in claim 15, wherein said shifting further comprises:

shifting the damper hub central axis relative the rotor axis of rotation in response to a hover flight profile; and shifting the damper central axis relative the rotor axis of rotation in response to a forward flight profile.

19. The method as recited in claim 15, wherein said shifting further comprises:

mechanically oscillating the inner connector of each lead/lag damper in phase with the 1P blade motion.

20. The method as recited in claim 15, wherein said shifting further comprises:

shifting the damper hub central axis relative to the rotor hub axis of rotation in response to an isolated mode regressive lead/lag damper eccentric location algorithm.

* * * * *